Patented Sept. 27, 1932

1,879,132

UNITED STATES PATENT OFFICE

CARL DORMAIER, OF LEVERKAUSEN, NEAR COLOGNE-ON-THE-RHINE, GERMANY, ASSIGNOR TO GENERAL ANILINE WORKS, INC., OF NEW YORK, N. Y., A CORPORATION OF DELAWARE

ARYLSULPHAMINO-ALPHA-NAPHTHOL SULPHONIC ACIDS

No Drawing. Application filed November 1, 1929, Serial No. 404,209, and in Germany November 6, 1928.

The present invention relates to a process of preparing arylsulphamino-alpha-naphthol sulphonic acids.

In accordance with the invention substantially pure arylsulphamino-alpha-naphthol sulphonic acids are obtainable by reacting with a caustic alkali upon arylsulphamino-naphthalene sulphonic acids containing at least two sulphonic acid groups, at least one of them standing in an alpha-position of the naphthalene nucleus, at a temperature above about 120° C.

The reaction may be performed, for instance, by introducing the arylsulphamino-naphthalene sulphonic acid into fused sodium or potassium hydroxide, advantageously in the presence of water, and then raising the temperature above 120° C., preferably to a temperature between about 140–220° C., if necessary with the application of superatmospheric pressure. The reaction mixture is then cooled, dissolved in water, acidified, boiled up in order to remove the sulphurous acid being formed during the reaction, and the reaction product is isolated by salting out, if necessary after partial evaporation.

The arylsulphamino-alpha-naphthol sulphonic acids thus obtainable are in the form of their alkali metal salts colorless to weakly colored compounds, easily soluble in water. The free acids are soluble in alcohol, from which they are precipitated by the addition of water.

The following examples illustrate my invention without limiting it thereto, the parts being by weight.

*Example 1.*—100 parts of 1-amino-naphthalene-3.6.8-trisulphonic acid are heated in aqueous solution and in the presence of sodium carbonate with 55 parts of benzene sulphochloride to about 60° C., and the reaction product is isolated by salting out.

110 parts by weight of the 1-phenylsulphamino-napthalene-3.6.8-trisulphonic acid thus obtained are introduced into a molten mixture of 220 parts of sodium hydroxide and 30 parts by weight of water, and the mixture is heated to about 140–160° C. for about 20 minutes. The reaction mixture is then dissolved in water, acidified with hydrochloric acid, boiled up until no more sulphurous acid escapes, and the reaction product is isolated by salting out with sodium chloride. The acid sodium salt of 1-phenylsulphamino-8-naphthol-3.6-disulphonic acid having in its free state the following formula

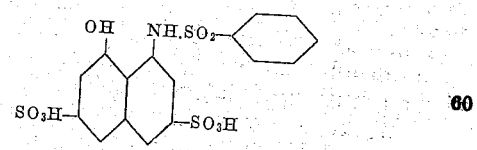

is thus obtained in form of greyish-white needles, easily soluble in water, difficulty soluble in alcohol.

When starting in this example with 1-p-toluenesulphamino-naphthalene-3.6.8-trisulphonic acid, the corresponding p-toluenesulphomino-naphthol disulphonic acid of the formula:

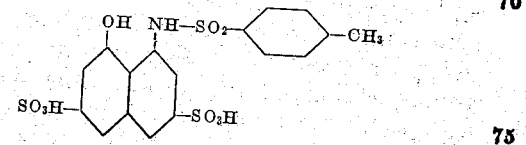

is obtained, having similar properties.

*Example 2.*—100 parts of 1-amino-naphthalene-4.6.8-trisulphonic acid are dissolved in 200 parts of water and 10 parts of sodium carbonate and to the solution 60 parts of benzene-sulphochloride are added, whereupon the reaction mixture is heated to about 60° C. until a sample does not react any more with sodium nitrite, care being taken that the reaction mixture always reacts weakly alkaline. After that 200 parts of sodium hydroxide are added and the temperature is slowly raised first to 130° C. and finally to 160° C. for 15 minutes, whereby the greatest part of the water distills off. After working up as described in Example 1, a product having in its free form the probable formula

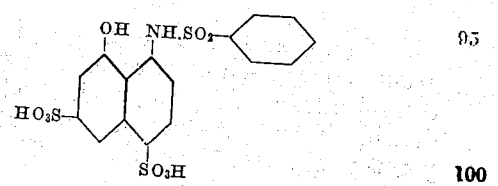

is obtained in form of greyish-white leaflets being easily soluble in water, difficulty soluble in alcohol.

When replacing in this example the benzene-sulphochloride by p-toluenesulphochloride, the 1-p-toluenesulphamino-8-naphthol-4.6-disulphonic acid will be obtained.

*Example 3.*—100 parts of 2-amino-naphthalene-6.8-disulphonic acid are dissolved in 200 parts of water and 10 parts of sodium carbonate and to this solution 60 parts of p-toluene-sulphochloride are added. The reaction mixture is then heated to 60–70° C. until a sample does not react any more with sodium nitrite, care being taken that the reaction mixture always reacts weakly alkaline.

240 parts of sodium hydroxide are then added and the reaction mixture is heated in an autoclave for about 8 hours to 180–200° C. After cooling the reaction mass is acidified with hydrochloric acid and the potassium salt of the 2-p-toluenesulphamino-8-naphthol-6-sulphonic acid is precipitated by the addition of potassium chloride.

In the above examples other arylsulphamino-naphthalene-sulphonic acids, such as hydroxy carboxylic-acid-naphthalene sulphonic acids, benzylsulphamino-naphthalene sulphonic acid, naphthalenesulphamino-naphthalene sulphonic acids and the like may be used with a similar effect.

I claim:—

1. Process which comprises reacting upon an arylsulphamino-naphthalene sulphonic acid containing at least two sulphonic acid groups, at least one of them standing in an alpha-position of the naphthalene nucleus with a caustic alkali at a temperature between about 140 and about 220° C.

2. Process which comprises reacting upon an arylsulphamino-naphthalene sulphonic acid containing at least two sulphonic acid groups, at least one of them standing in an alpha-position of the naphthalene nucleus with a caustic alkali in the presence of water at a temperature between about 140 and about 220° C.

3. Process which comprises reacting upon a compound of the formula

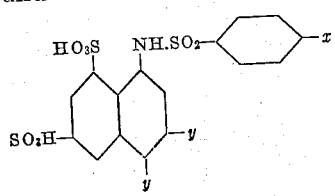

wherein $x$ stands for hydrogen or the methyl group, one $y$ means hydrogen and the other the sulphonic acid group, with sodium hydroxide in the presence of water at a temperature of about 130 to about 160° C.

4. The process which comprises reacting upon a compound of the formula:

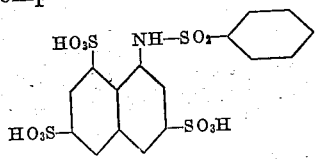

with sodium hydroxide, in the presence of water, at a temperature of 140 to 160° C.

5. The process which comprises reacting upon a compound of the formula:

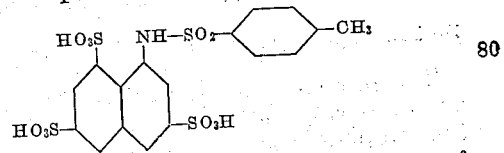

with sodium hydroxide, in the presence of water, at a temperature of 140 to 160° C.

In testimony whereof, I affix my signature.

CARL DOBMAIER.